United States Patent [19]

Feit et al.

[11] 4,389,386

[45] Jun. 21, 1983

[54] HNCO MANUFACTURE BY CATALYTIC OXIDATION OF HCN WITH A PD DOPED AG CATALYST

[75] Inventors: Yoseph Feit; David R. Kilanowski, both of Stamford; Kenneth E. Olson, Riverside, all of Conn.

[73] Assignee: American Cyanamid Company, Stamford, Conn.

[21] Appl. No.: 305,058

[22] Filed: Sep. 24, 1981

[51] Int. Cl.$^3$ ............................................... C01C 3/14
[52] U.S. Cl. ................................... 423/365; 252/474
[58] Field of Search ................................ 423/365, 384

[56] References Cited

U.S. PATENT DOCUMENTS

| 2,712,493 | 7/1955 | Moje | 423/384 |
|---|---|---|---|
| 3,032,582 | 5/1962 | Zima | 423/384 |
| 3,239,309 | 3/1966 | Zima et al. | 423/384 |
| 3,615,192 | 10/1971 | Olivier | 423/384 |
| 4,032,620 | 6/1977 | Onada et al. | 423/384 |

FOREIGN PATENT DOCUMENTS

| 692522 | 8/1964 | Canada | 423/384 |
|---|---|---|---|
| 948113 | 1/1964 | United Kingdom | 423/384 |

Primary Examiner—O. R. Vertiz
Assistant Examiner—Wayne A. Langel
Attorney, Agent, or Firm—Steven J. Hultquist

[57] ABSTRACT

A process for the manufacture of isocyanic acid by catalytic oxidation of hydrogen cyanide gas utilizing a silver catalyst doped with palladium and a novel metallic silver catalyst in the form of silver crystals having a palladium coating.

3 Claims, No Drawings

HNCO MANUFACTURE BY CATALYTIC OXIDATION OF HCN WITH A PD DOPED AG CATALYST

This invention relates to the manufacture of isocyanic acid, HNCO, by the catalytic oxidation of hydrogen cyanide in a gas mixture with oxygen. More particularly, the invention provides a metallic silver catalyst doped with palladium which is effective to increase the conversion of hydrogen cyanide without adversely effecting selectivity for the desired isocyanic acid product while enabling reaction to proceed at lower temperatures.

The oxidation of hydrogen cyanide with oxygen in a gaseous state reaction using a silver catalyst has long been known (see U.S. Pat. No. 2,712,493 to Moje). Gold and silver-gold alloys have also been used as catalysts (see U.S. Pat. No. 3,032,582 to Zima). The catalytic oxidation is exothermic and is usually conducted at elevated temperatures in the range from about 300° to about 800° C. When operating under adiabatic conditions, the reaction temperature is controlled by the use of an inert diluent gas, such as nitrogen, in the reactant feed mixture as described in Katz and Olson application Ser. No. 305,057 filed concurrently herewith. The principal reactions are those favoring the production of cyanogen or isocyanic acid or both. Water and other by-products, such as derivatives of isocyanic acid, CO and $CO_2$ are also formed.

Isocyanic acid is particularly useful in the production of cyanuric acid and in the manufacture of various isocyanates. The presence of cyanogen, which is difficult to separate from isocyanic acid, is usually undesirable in such reactions but for many purposes small amounts of cyanogen, i.e., on the order of 1% or less, can be tolerated. Processes for the manufacture of isocyanic acid by oxidation of HCN are desirably operated under conditions which will minimize the production of cyanogen.

In manufacturing isocyanic acid by catalytic oxidation of hydrogen cyanide with oxygen, the molar ratio of oxygen to hydrogen cyanide in the reactant feed mixture is maintained at or above 0.5. It has been observed that cyanogen yield under such conditions usually will decrease as reaction temperature is increased, reaching less than 1% at temperature above 700° C. Such high reaction temperatures tend to shorten the catalyst life and so lower temperatures would be preferred. As the reaction temperature is lowered, however, the production of cyanogen increases even when using high molar ratios of oxygen to hydrogen cyanide. Under adiabatic conditions it is difficult to sustain the catalytic reaction at temperatures below about 640° or 650° C.

It is, therefore, an important object of the present invention to provide a process for the manufacture of isocyanic acid which can be carried out at temperatures less than 700° C. and to as low as about 575° C. under adiabatic conditions, while holding the yield of cyanogen based on hydrogen cyanide to less than 1%.

It is also an important object of this invention to provide a novel catalyst useful in the catalytic oxidation of hydrogen cyanide to produce substantial conversion of the hydrogen cyanide at temperatures which are consistent with long catalyst life and to produce relatively high yields of the desired isocyanic acid with minimum yields of by-product cyanogen.

In accordance with this invention a silver catalyst is employed which has been doped with palladium as metal or salt or oxide. The effective proportion of palladium to silver in the catalyst composition may be from a few parts per million to several thousand parts per million, preferably between 20 parts per million and 10,000 parts per million. Preferably the silver catalyst is in the form of silver crystals. The palladium may be applied to the silver catalyst surface as a coating by electroless methods or may be applied by other suitable methods.

Self-sustaining reaction temperatures from 575° to 700° C. are utilized with oxygen at or in excess of that required stoichiometrically, i.e. the molar ratio of oxygen to hydrogen cyanide is 0.5 or higher. The reactants are usually introduced to the catalytic reactor at pressures approximately atmospheric, i.e., just sufficient to produce the desired flow rates, but higher pressures can be used. Typically, hydrogen cyanide conversion is 99%+, HNCO yield is 75–85% with low cyanogen yields, often less than 1%.

The reaction can proceed at temperatures as low as 500° C. with added heat. In our most preferred embodiments, however, the reaction is preferably carried out under adiabatic conditions at somewhat higher reaction temperatures. Reaction is initiated by preheating the catalyst as described in more detail in the aforementioned copending Katz and Olson application. When the catalytic reaction has commenced the temperature is maintained by the reaction exotherm and is controlled by regulating the proportion of inert diluent gas in the reactant feed stream. The quantity of diluent gas required to control temperature under approximately adiabatic conditions will be more than the quantity of nitrogen which is supplied by an amount of air used to supply the oxygen required for the reaction.

A silver catalyst suitable for catalyzing the oxidation of hydrogen cyanide in the gaseous state at elevated temperatures can be prepared by conventional electrolysis of an aqueous solution of a suitable silver salt. While silver purity on the order of 99.9% is obtained by such a technique, such a high degree of purity is probably not necessary. The silver so prepared is recovered as silver metal crystals in needle form with varying particle size. The electrolysis can be controlled to a certain extent to favor a particular particle size distribution. For the purpose of the oxidation of HCN we prefer to use crystals in the size range from about 0.1 to about 5 mm.

For the purpose of comparing results, it is desirable to screen the silver particles in order to provide a fairly uniform particle size so that results from one test to another are comparable. In the following examples all of the catalyst was in the form of electrolytic silver crystals of 99.9% purity having a particle size of 8×30 mesh, a proprietary designation indicating particles 0.6 to 2.0 mm thick.

A quantity of 8×30 mesh silver particles were plated with palladium by the electroless deposition technique described in U.S. Pat. No. 2,915,406 to provide a bulk proportion of palladium to silver of 200 ppm. This technique involves the preparation of a 4.9 g/l palladium solution by dissolving 2.08 grams of $PdCl_2$ in 5.5 ml acetone, 230 ml $NH_4OH$(30%) and 20 ml deionized water. The solution is then filtered. Sixty grams of silver crystals, washed in acetone, then 1:1HCl solution and then water, were placed in the palladium solution in a round bottom flask on a rotating device, and 0.3 ml of a 1 molar hydrazine solution in water was added over a one hour period using a syringe pump. The solution was then decanted, and the silver crystals were dried.

The palladium plated silver particles were analyzed by a scanning Auger microprobe and the following properties were determined:

1. The components of the catalyst surface were silver, palladium, chlorine and carbon.
2. Greater than 70% of the catalyst surface was covered with palladium to a thickness of at least 20–50 nanometers, indicating a good clean plating process. In this thickness range palladium constituted at least 10 atom percent of the surface.
3. Observation of palladium and silver at a given spot (2,000 nm diameter) suggested that the palladium had diffused into the silver forming an alloy or that the palladium layer was not contiguous, i.e., contained holes.
4. Chlorine was found to be associated both with the palladium and silver in roughly equal atomic proportions.
5. Small regions of the surface were extremely rich in palladium and chlorine.
6. Carbon was present as a thin layer (about 5 nm on the surface). In addition, isolated spots were very rich in carbon.
7. The 200 ppm bulk palladium content as determined by plasma spectroscopy was distributed at the crystal surface and fell off rapidly to less than 1 to 5% at a depth of 500–1000 Å, consistent with a 25% palladium skin 500 A thick over pure silver.

EXAMPLES

In each of the following tabulated examples a catalyst of silver crystals in the amount of 50 grams, except where otherwise indicated, was charged to a glass lined reactor to make a 40 mm diameter by 13 mm high catalyst bed supported on quartz chips. A mixture of hydrogen cyanide gas, air and nitrogen was fed to the bed in each example at a rate, at an oxygen to hydrogen cyanide molar ratio and at a nitrogen to hydrogen cyanide molar ratio as indicated in the Tables I and II. Also shown in the Tables are the reaction temperature and the results reported as selectivity which is the conversion to the product and several by-products based on the hydrogen cyanide converted. The hydrogen cyanide contained 0.02% sulfur dioxide, as a polymerization inhibitor. In Examples I–VI shown in Table I the catalyst was the palladium doped catalyst prepared by the electroless deposition process described above, containing a bulk proportion of palladium to silver of 200 ppm. Examples A and B in Table I were examples utilizing a comparable silver catalyst without the palladium doping, also of size 8×30 mesh. The temperatures of Examples A and B were as low as possible without extinguishing the reaction.

Examples I–VI all utilized the same charge of palladium doped catalyst. The examples have been arranged in order of increasing reaction temperature but in fact were carried out in the following order: VI, II, III, V, I, and IV.

It will be noted that the increased residence time of Example I lowered the cyanogen selectivity from approximately 3% to approximately 1%, which is considered to be very low for reaction temperatures under 600° C. The improvement, however, was at the expense of isocyanic acid yield. Conversely decreasing residence time in Example IV at a slightly higher operating temperature gave only minimal increase in isocyanic acid yield with five times the cyanogen production.

The catalyst particles promptly fused together at reaction temperatures, despite the relatively higher melting point of silver and of silver and palladium alloys. The fusion was limited to the points where the particles touch together only and had no significant effect on the porosity of the catalyst bed.

The palladium doped silver catalyst was on stream for more than 36 hours intermittently over a period of six days during which the reactor was closed down each night.

Bulk analysis of the catalyst after it had been used showed the palladium content of the catalyst remained unchanged at 200 ppm. The surface concentration of palladium was, however, at least 10 times lower than that of the fresh catalyst. Surface chlorine was also present at a much lower level.

Profiling at one typical point showed about 98% silver with palladium and chlorine near the 1–2% limit of detection throughout a 1500 A etching depth.

Small surface regions (10–20 microns in size) were rich in sulphur, presumably from a sulphur dioxide inhibitor in the hydrogen cyanide feed.

The surface morphology of the catalyst changed radically. Initial sharp edges were rounded, as expected from simple sintering or recrystallization, but the surface also appeared to have more depth relief. This evidence suggests a reaction-driven surface process. The net surface area probably increased.

Apparently the palladium had diffused into the silver forming an alloy. Pure silver then migrated to the surface.

A second catalyst was prepared using 8×30 mesh silver particles containing 2000 ppm palladium by bulk analysis. The coating was prepared using a solution of palladium nitrate acidified with nitric acid. The silver crystals were slurried in the acidified solution, decanted and dried.

Table II shows the results of four consecutive runs as Examples VII–X using this catalyst.

It will be apparent on comparison of Tables I and II that the increase in proportion of palladium resulted in a significant decrease of cyanogen yield.

TABLE I

| CATALYST PREPARED BY ELECTROLESS DEPOSITION | | | | | | | | |
|---|---|---|---|---|---|---|---|---|
| | Example No. | | | | | | | |
| | I | II | III | IV | V | VI | A | B |
| Temp. °C. | 592 | 595 | 595 | 618 | 620 | 625 | 632 | 637 |
| HCN feed, g/hr. | 37 | 50 | 50 | 66 | 50 | 50 | 50 | 50 |
| Mole Ratios | | | | | | | | |
| $O_2$/HCN | 0.58 | 0.60 | 0.60 | 0.58 | 0.60 | 0.60 | 0.60 | 0.60 |
| $N_2$/HCN | 11.7 | 11.7 | 11.7 | 10.4 | 11.9 | 11.6 | 11.4 | 11.3 |
| HCN CONV., % | 99.6 | 99.3 | 100 | 99.9 | 99.7 | 99.8 | 99.5 | 99.3 |
| NORMALIZED SELECTIVITY %[1] | | | | | | | | |
| HNCO | 80 | 85 | 84 | 80 | 78 | 76 | 74 | 81 |
| Solids[2] | 1.7 | 1.3 | 2.2 | 4.5 | 2.2 | 1.3 | 0.68 | 1.4 |
| CO | 2.0 | 1.1 | 1.2 | 2.4 | 2.8 | 2.1 | 2.3 | 0.3 |
| $CO_2$ | 15.4 | 10.6 | 9.5 | 9.6 | 15.9 | 19.9 | 19.6 | 14.3 |
| $(CN)_2$ | 1.3 | 1.7 | 3.3 | 3.9 | 0.78 | 0.44 | 3.8 | 2.6 |

[1]Normalized selectivity to component i, $$\% = \frac{\text{moles carbon in product } i}{\sum_j \text{moles carbon in product } j} \times 100$$

[2]Solids consist of cyanuric acid, cyamelide, urea, etc.

TABLE II

CATALYST PREPARED BY Pd(NO$_3$)$_2$ DEPOSITION

| | Example No. | | | |
|---|---|---|---|---|
| | VII | VIII | IX | X |
| Temp. °C. | 632 | 625 | 585 | 625 |
| HCN feed, g/hr | 48.6 | 50.2 | 50.2 | 64.8 |
| Mole Ratios | | | | |
| O$_2$/HCN | 0.62 | 0.60 | 0.60 | 0.60 |
| N$_2$/HCN | 11.6 | 11.0 | 10.8 | 11.0 |
| HCN conv. % | 99.7 | 99.5 | 99.4 | 99.2 |
| NORMALIZED SELECTIVITY | | | | |
| HNCO | 75 | 80 | 78 | 79 |
| Solids | 3.2 | 2.2 | 4.2 | 2.0 |
| CO | 2.9 | 2.9 | 2.7 | 2.8 |
| CO$_2$ | 18.3 | 14.7 | 15.3 | 15.3 |
| (CN)$_2$ | 0.53 | 0.25 | 0.32 | 0.35 |

We claim:

1. In the process for the manufacture of isocyanic acid by catalytic oxidation of hydrogen cyanide in the gaseous state at temperatures in the range from about 500° to about 800° C. with at least one-half mole of oxygen per mole of hydrogen cyanide, the improvement in which the catalyst comprises a metallic silver catalyst having palladium at the catalyst surface, in an amount effective to increase the catalytic activity of said catalyst in respect of conversion of said hydrogen cyanide.

2. The process according to claim 1 in which the proportion of palladium to silver is in the range from about 20 to about 10,000 parts per million.

3. The process according to claim 2 in which the silver is in the form of crystals and the palladium is present as a coating on said crystals.

* * * * *